(12) United States Patent
Lo et al.

(10) Patent No.: US 9,009,584 B2
(45) Date of Patent: Apr. 14, 2015

(54) PEEKING INTO THE Z-DIMENSIONAL DRAWER

(75) Inventors: Henry Lo, Surrey (CA); Ian Forneri, Ridgeville (CA); Julian Gosper, Vancouver (CA); Oliver Woolgar, Burnaby (CA); Paul McArthur, Vancouver (CA); Qing Li, Vancouver (CA); Soroush Momen-Pour, Coquitlam (CA); Stephen Petschulat, Coquitlam (CA)

(73) Assignee: Business Objects Software Limited, Dublin (IE)

( * ) Notice: Subject to any disclaimer, the term of this patent is extended or adjusted under 35 U.S.C. 154(b) by 607 days.

(21) Appl. No.: 12/481,591

(22) Filed: Jun. 10, 2009

(65) Prior Publication Data

US 2010/0318891 A1 Dec. 16, 2010

(51) Int. Cl.
G06F 17/00 (2006.01)
G06F 17/30 (2006.01)

(52) U.S. Cl.
CPC .... *G06F 17/30554* (2013.01); *G06F 17/30572* (2013.01); *G06F 17/30592* (2013.01)

(58) Field of Classification Search
CPC ............ G06F 17/246; G06F 17/30554; G06F 17/30572; G06F 17/30592
USPC .......................... 715/200, 212, 213, 214, 215
See application file for complete search history.

(56) References Cited

U.S. PATENT DOCUMENTS

| | | | |
|---|---|---|---|
| 5,359,724 A | 10/1994 | Earle | |
| 7,669,115 B2 * | 2/2010 | Cho et al. | 715/212 |
| 7,747,939 B2 * | 6/2010 | Thanu et al. | 715/212 |
| 7,774,695 B2 * | 8/2010 | Kobylinski | 715/227 |
| 2002/0091728 A1 * | 7/2002 | Kjaer et al. | 707/503 |
| 2002/0138512 A1 * | 9/2002 | Buresh et al. | 707/507 |
| 2002/0184260 A1 * | 12/2002 | Martin et al. | 707/503 |
| 2003/0149708 A1 * | 8/2003 | Tsao | 707/104.1 |
| 2007/0266308 A1 * | 11/2007 | Kobylinski | 715/509 |
| 2008/0005677 A1 | 1/2008 | Thompson | |
| 2008/0036767 A1 | 2/2008 | Janzen | |
| 2008/0082908 A1 | 4/2008 | MacGregor | |
| 2008/0109740 A1 | 5/2008 | Prinsen et al. | |
| 2009/0037803 A1 * | 2/2009 | Bauchot | 715/214 |
| 2009/0217147 A1 * | 8/2009 | Thomsen | 715/214 |
| 2009/0327852 A1 * | 12/2009 | MacGregor et al. | 715/214 |

FOREIGN PATENT DOCUMENTS

IL  WO9960491 A1  11/1999

OTHER PUBLICATIONS

European Patent Office; Extended European Search Report dated Aug. 18, 2010; EPO, Munich, Germany.

(Continued)

*Primary Examiner* — Stephen Hong
*Assistant Examiner* — Gregory J Vaughn

(57) ABSTRACT

Described herein are methods and systems for analyzing multidimensional data that use tangential exploration of data via a third or Z-dimension to the current two-dimensional view. The tangential exploration allows higher dimensionality to be explored without causing visual clutter.

19 Claims, 7 Drawing Sheets

(56) References Cited

OTHER PUBLICATIONS

David Dixon and Jean-Michel Franco; Designing Compelling Business Intelligence Business Cases for an SAP® Software Landscape: Scenarios for Leveraging Solutions from SAP and Business Objects; Inforte Whitepaper; Feb. 2008; p. 17; Inforte—A Business & Decision Company; Chicago, USA; (http://www.businessdecision.co.uk/uploads/Document/0d/WEB_CHEMIN_4315_1205140838.pdf).

* cited by examiner

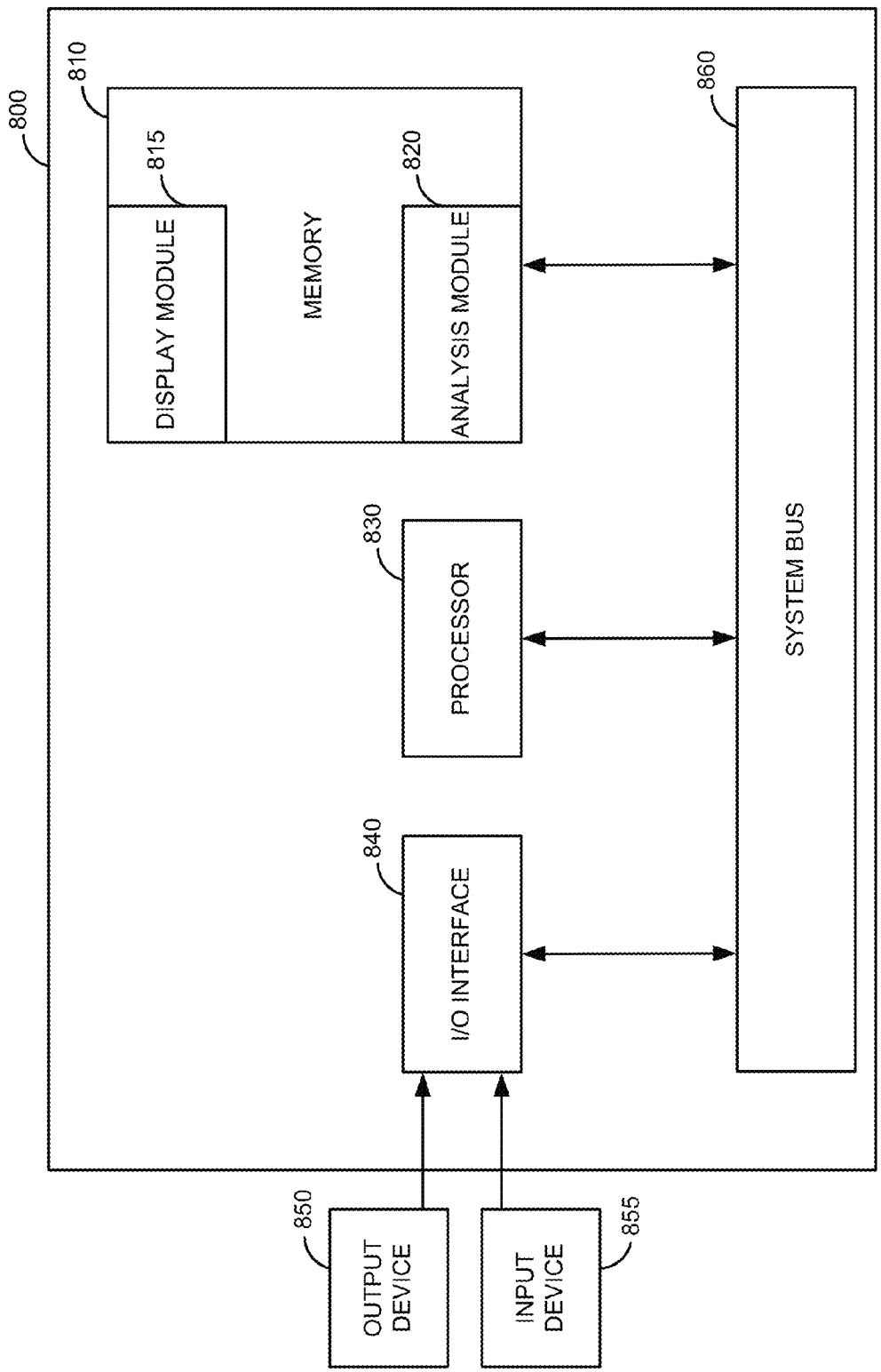

PEEKING INTO THE Z-DIMENSIONAL DRAWER

FIELD OF THE INVENTION

The invention relates to a graphical user interface. More precisely, the invention relates to visualization of data in complex multidimensional structures.

BACKGROUND OF THE INVENTION

The field of business intelligence (BI) generally refers to a category of systems and software applications used to improve decision-making and governance of organizations such as businesses. These software tools provide techniques for better using data. For example, collecting, viewing, exploring, reporting on, analyzing and acting on data. On-Line Analytical Processing (OLAP) tools are a subset of BI tools. OLAP tools are suited to ad hoc analyses. OLAP generally refers to a technique of providing fast analysis of shared multidimensional information stored in a database. Generally, the data is arranged in a schema which simulates a multidimensional arrangement. OLAP systems provide a multidimensional conceptual view of data, including full support for measures, hierarchies and multiple hierarchies. This framework is used because it is a logical way to arrange data when user may query and aggregate the data in many different ways. These tools allow for users to initiate queries without the need to know how the data is organized—ad hoc information retrieval. This does mean that redundant information is stored but the wide adoption of OLAP tools suggests this overhead in data storage is acceptable.

OLAP tools help users work with information through use of an OLAP server that is specifically designed to support and operate on multidimensional data sources. OLAP is typically implemented in a multi-user client/server model where the client displays data that a server retrieves from the data source or cube. The design of the OLAP server and the structure of the data are optimized for rapid ad hoc information retrieval in any orientation, as well as for fast, flexible calculation and transformation of raw data members on formulaic relationships. As well, OLAP tools are used to explore data.

Currently, known techniques for analyzing multidimensional data are unsatisfactory. Analyzing a complex multidimensional space requires navigation and changes of view. Navigating often is disorienting and changing views disrupts the train of thought. Spawning more windows and components can lead to visual clutter and utilizing higher dimensionality has proved to be difficult. It would be desirable to provide improved techniques for manipulating complex multidimensional data. In particular, it would be desirable to provide a method that allows viewing something without navigating away or changing the view and at the same time at a low performance cost.

SUMMARY OF THE INVENTION

Methods, computer readable media and systems for analyzing multidimensional data are described. In one embodiment of the invention, a method includes selecting a tuple associated with a first member of a first dimension and a second member of a second dimension, selecting a third dimension and retrieving a data distribution associated with the first member, the second member and the third dimension. Finally visualizing the data distribution in a Graphical User Interface (GUI).

In one embodiment of the invention, a computer readable medium comprises instructions that cause the execution of a method that includes selecting a slice axis dimension as a third dimension to a two-dimensional view, then selecting at least one cell from the two-dimensional view to show the distribution of the value of the at least one cell over the third dimension. The method also includes retrieving data for the distribution of the value of the selected cell and displaying the data.

In another embodiment of the invention, a system includes a memory with an analysis module to retrieve data for the distribution of a cell value over a third dimension and a display module to organize the representation of the retrieved data in a (GUI). The system also includes a processor to execute the instructions in the memory with the analysis module and the display module and a display to render a GUI to represent the output from the analysis module and the display module.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 8 is a block diagram of an embodiment of the invention for a computer system to analyze multidimensional data.

DETAILED DESCRIPTION

Described herein are methods and systems for analyzing multidimensional data that use tangentially exploration of data via a third or Z-dimension to the current two-dimensional view. The tangentially exploration allows higher dimensionality to be utilized without causing visual clutter.

Various features associated with the operation of the present invention will now be set forth. Prior to such description, a glossary of terms used throughout this description is provided. The definitions set forth herein are exemplary and are not intended to detract from any ordinary meaning of such terms in the art.

Axis—(1) Axis is a dimension in a result set to a multidimensional query. Since, in an OLAP query the results are another cube (i.e., a sub-cube) a dimension defining, in part, the results is called an axis. This makes it simpler to distinguish them from the dimensions in the source cube. (2) An axis defines a visualization. For example the rows of a crosstab are an axis. An axis can include one or more dimensions.

Crosstab—Crosstab (abbreviation of cross-tabulation) refers to visualization of data that, in one embodiment, displays the joint distribution of data related to two or more variables simultaneously so to enable easy comparison of the data across the two or more variables. Crosstabs are usually presented in a matrix format that is why a crosstab is sometimes called a matrix. The data is organized in rows and columns. Each cell shows the value associated with the specific combination of row and column headings. Dimension members are listed across the first row and down the first column; the data for measures appears in the cells that form the body of the crosstab. A crosstab can be used to display summary information and show how data varies across dimensions, such as sales by region by month.

Cube—Cube is a logical organization of measures with identical dimensions. The edges of a cube contain dimension members and the body of a cube contains data values. For example, a sales cube may have edges containing members from the time, product, and customer dimensions. Volume sales and unit sales may be two measures in a sales cube. OLAP (Online Analytical Processing) cubes can be thought as higher dimensional extensions to the two-dimensional array of crosstabs, spreadsheets and the like.

Figure 7:
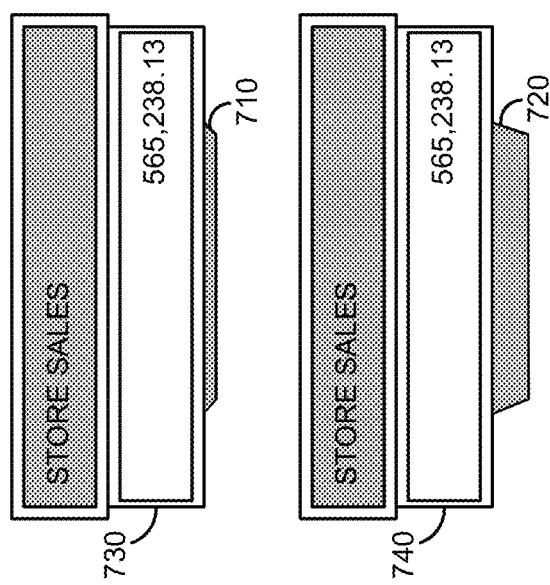
FIG. 7 is an exemplary illustration of a handle.

Handle—Handle is a graphical user interface (GUI) component shown attached to a cell. It has the appearance of a handle. This will provide the affordance to a user to click on and drag the handle towards them. This will open the cell like a drawer. This motion is analogous to drag and pull motion of a handle to open a drawer. Knobs and other pulls can be used. An exemplary handle is shown in FIG. 7.

MDX query—Multidimensional Expressions (MDX) is a query language for OLAP databases, much like SQL is a query language for relational databases. It is also a formula language. An alternative to MDX is the mdXML language part of the XML for Analysis standard.

Measure—Measure is a quantity as ascertained by comparison with a standard, usually denoted in some unit, e.g., units sold, dollars. A measure, such as revenue, can be displayed for the dimension "Year". Corresponding measures can also be displayed for each of the values within a dimension.

Slice—A slice is a subset of a cube corresponding to a member of a dimension. In other words, by slicing along one dimension one specifies a value for that dimension that all members of resulting subset share. Note the subset does not include that dimension. When forming a query a slice dimension corresponds to one member. In the three dimensional case by slicing along the third dimension of a cube one is left with a "sub-cube" that is two dimensional array of data. Higher dimensional analogues follow. In an MDX statement a sliced dimension is specified by a WHERE clause."

Z-dimension—Z-dimension is an additional dimension to the dimensions in a current visualization. For example, the third dimension—analogous to the Z-dimension in a three dimensional Cartesian coordinate system—to two dimensions used to construct a crosstab.

Figure 1:
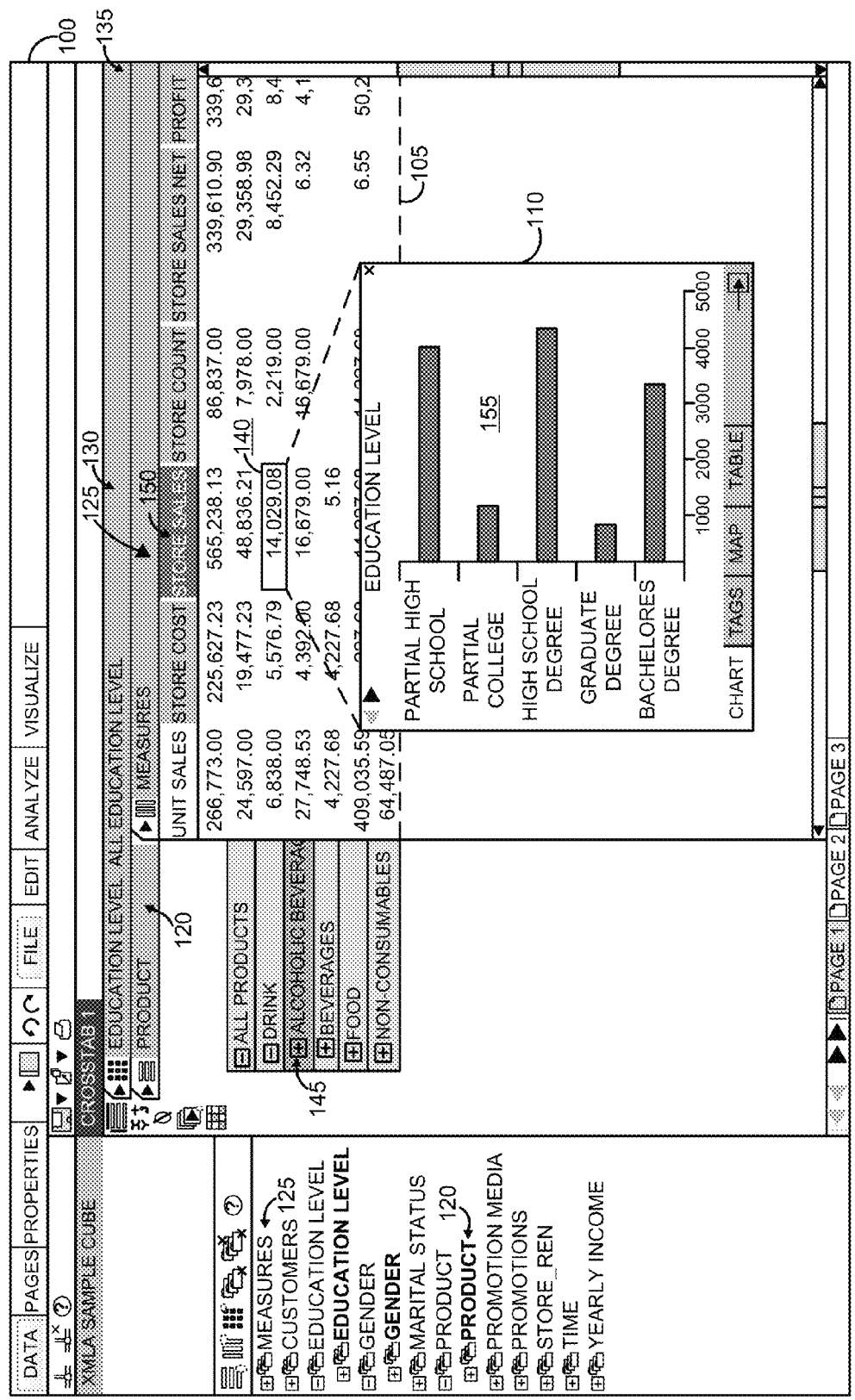
FIG. 1 is an exemplary screenshot of a GUI showing a Z-drawer associated with a cell in a crosstab.

FIG. 1 is an exemplary screenshot of a GUI 100 showing a crosstab 105 associated with a Z-drawer 110 according to an embodiment of the current invention. The crosstab 105 is defined in part by dimensions Product 120 and Measures 125. The cross table includes an additional dimension Education Level 130 on the slice axis 135. Additional dimensions are used as the Z-dimensional axis as these are analysis hierarchies that the data cube may be sliced along. An axis can include multiple dimensions as the Z-dimension. The selection of Z-dimensional axis is made by a selection of a cell in the crosstab 105. After selection the user analyses its content. The analysis result is presented in the so called Z-drawer 110.

The Z-drawer 110 is used to represent the distribution of the cell value over one or more additional dimensions. In the current example, a cell 140 is selected. The selected cell 140 is a tuple at the intersection of the Alcoholic Beverage row 145 and the Store Sales column 150. The Z-drawer 110 contains data for the distribution of the aggregate value of a selected cell 140 over its Z-dimension. The Z-drawer 110 shows a horizontal bar chart 155 that decomposes the aggregate value of the cell 140 along the Education Level dimension 130. In other words, how each education level contributes to the aggregate value 14,029.08 is plotted in the chart 155. The chart 155 or other content of the Z-drawer 110 is generated by sending a query to a database. When the query is multi-dimensional the members Store Sales and Alcoholic Beverage are stacked on a row axis for the query with the Z-dimension on the column axis. By stacked on the row axis this means both members define the row axis. In this example, that the visualization in the Z-Drawer shows store sales for alcoholic beverages against education. In some embodiments, this convention is reversed with respect to row and column axis. Accordingly, the visualization in the Z-drawer can differ with embodiments. For example, the chart may be a bar chart, but also a line chart or a pie chart.

Figure 2:
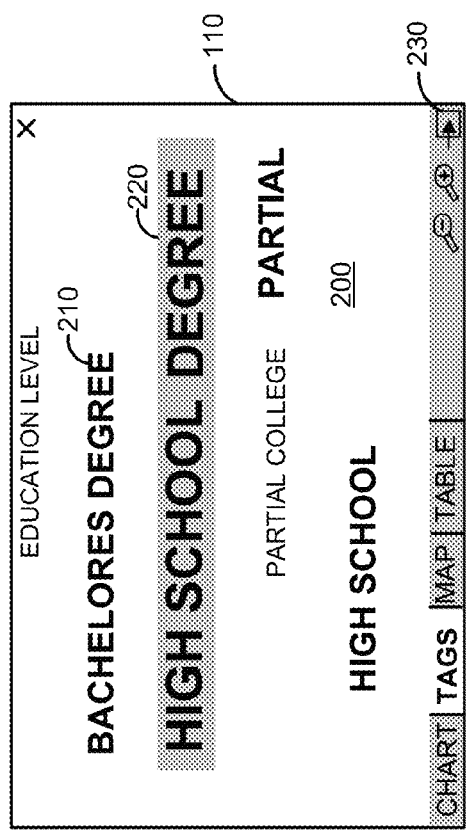
FIG. 2 is an exemplary illustration of a tag cloud representing values along the Z-dimension.
Figure 3:
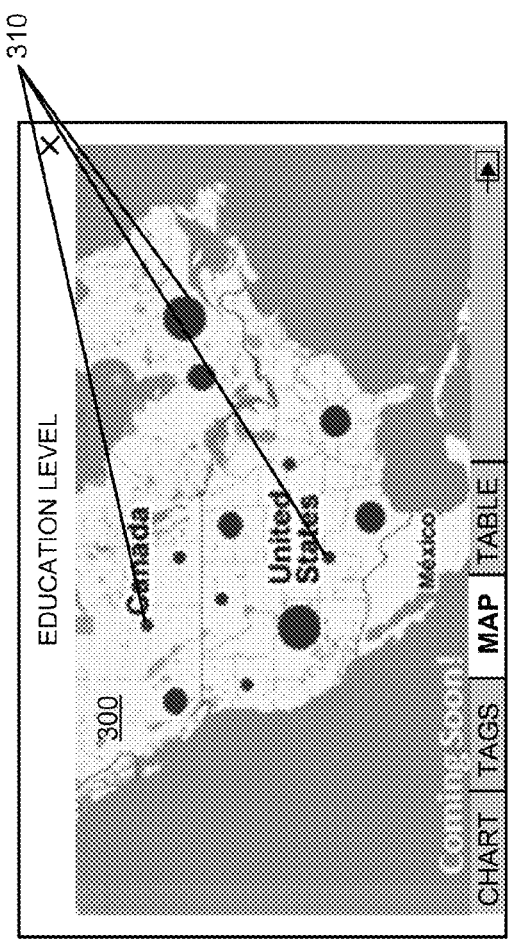
FIG. 3 is an exemplary illustration of a map representing values along a Z-dimension that is geographic hierarchy.

The representation of the data is not restricted to charts only, as in FIG. 1. In FIG. 2, a tag cloud 200 is used. The size of a member's unique name is proportional to its value. The proportionality can be linear, non-linear, sub-linear, super-linear, or acceptable combinations like non-linear and sub-linear. In this example, the tag Bachelors Degree 210 is smaller than the tag High School degree 220, thus showing the relation between these members and specifically showing for the distribution of the Z-dimension's member's value of the selected cell. An alternative visualization is a map. Depending on the data, maps may be used for representing the distribution along the Z-dimension. A map 300 of most of North America is shown in FIG. 3. The size of the dots 310 is proportional to the value it represents. The nature of the proportionality can be similar to that used for tag clouds. Another common visualization is a table. Sometimes, conventions of presenting data suggest tables over charts, maps and the like.

The list of visualizations bar chart, tag cloud, map and table is not exhaustive. In general many different types of visualizations are possible. See Table 1 for compatibility or suitability between various visualization types, various dimension types for a single selected cell. By examining metadata about the dimension the suitability of a visualization can be inferred. For any geographic dimension a map is suitable. If the Z-dimension is a time based dimension this suggests using of a line chart.

TABLE 1

| Dimension Type | Visualization (Type - Member Value) | Suitable if one cell selected? (Remarks) |
| --- | --- | --- |
| Geography | Map - Points | ✓ |
| | Map - Risers | ✓ |
| | Table | ✓ |
| Time | Chart - Line | ✓ |
| | Table | ✓ |
| Non-Specialized | Cloud - Word Size | ✓ |
| | Chart - Line | ✓ |
| | | (Suitable if many members) |
| | Chart - Pie | ✓ |
| | | (Suitable if fewer members) |
| | Table | ✓ |

Figure 4:
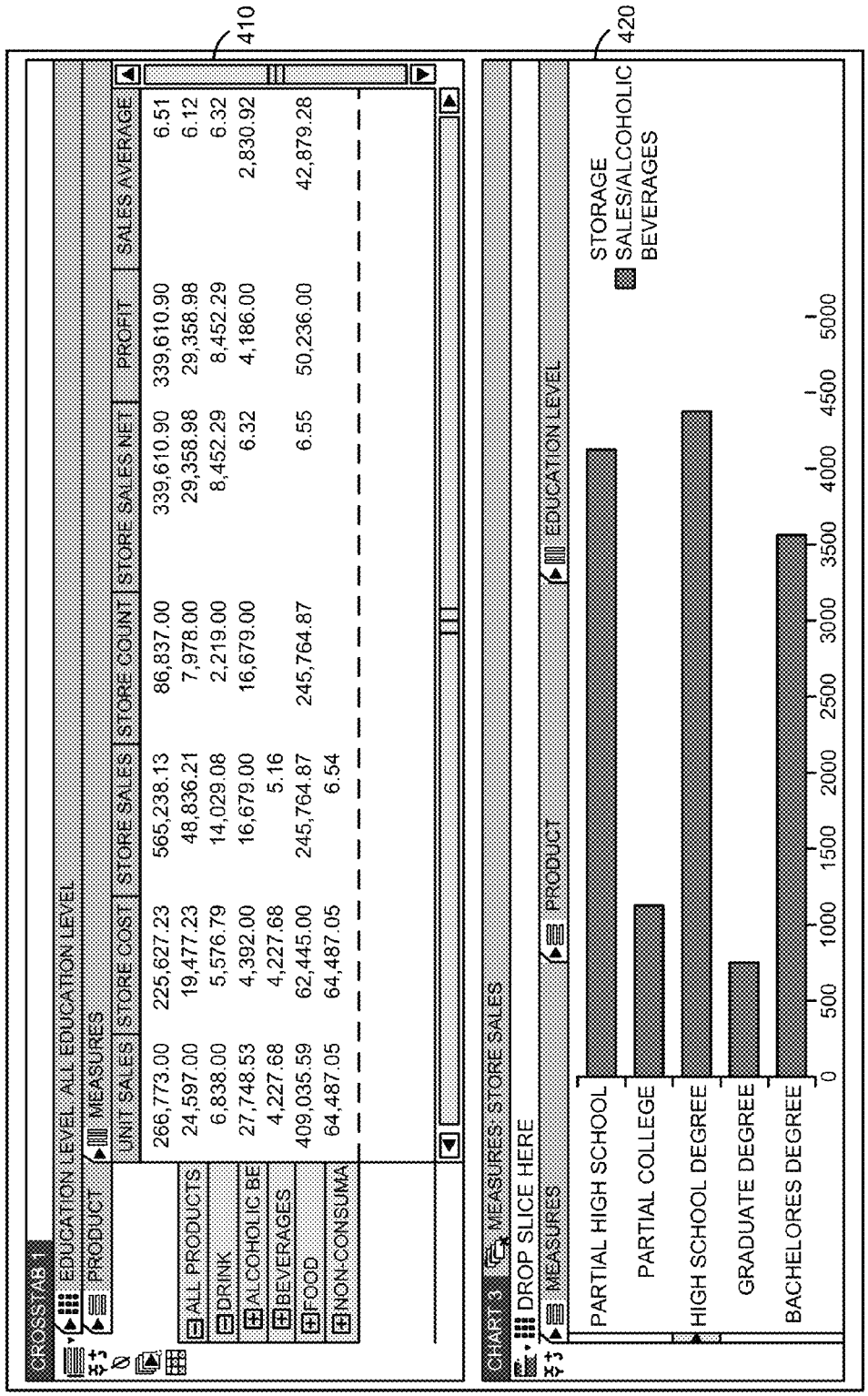
FIG. 4 is an exemplary screenshot of a GUI, showing an enlarged representation of a Z-drawer.

If a deeper analysis is needed on complex and large dataset, the Z-drawer could be separated into a new individual application component, as shown in FIG. 4. This is known as the "Tear Off" feature and the Z-drawer is expanded to cover the ideal area of the design layout. In the given example, the screen is divided into two parts, where the upper part 410 shows the content of the crosstab with the data that is analyzed, while the bottom part 420 consists of the Z-drawer itself. The "Tear Off" of the Z-drawer is an option which provides a new view of the content of the Z-drawer. The invocation of the "Tear Off" feature may be performed by a specially designed button in the Z-drawer, for example button 230 in FIG. 2.

Figure 5:
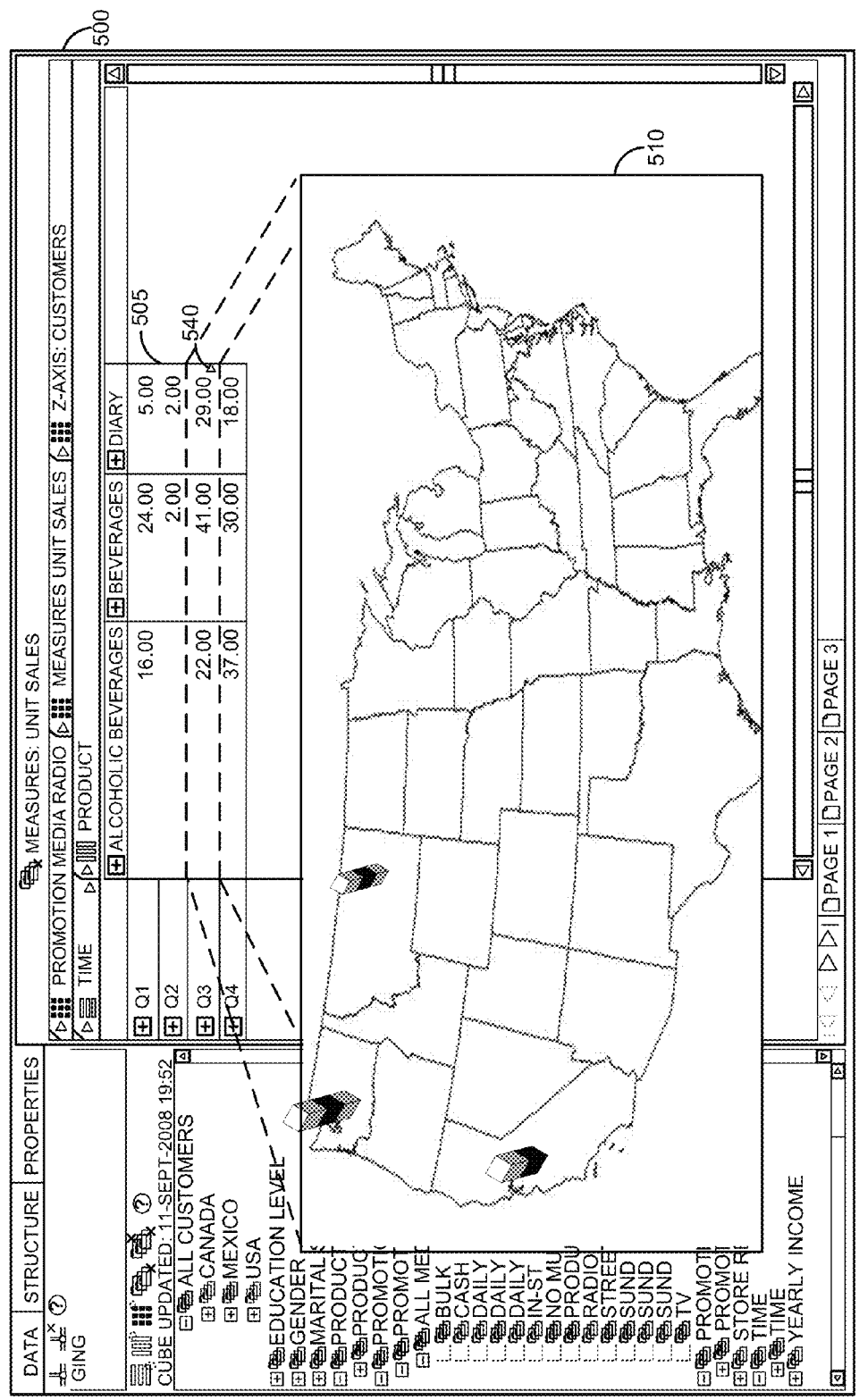
FIG. 5 is an exemplary screenshot of a GUI showing a Z-drawer for a collection of cells.

An example of a Z-drawer over a collection of cells is given in FIG. 5. A GUI 500 includes a crosstab 505 and Z-drawer 510 showing the distribution of all of the corresponding cell values over a plurality of selected members 540. The Z-drawer corresponds not to a query based on one cell but a collection of cells.

In some embodiments, the plurality of selected members 540 arises from a user selection from a crosstab. There a two general cases. One, the plurality of cells form a vector corresponding to one member on one axis and many members on the other. The selected members 540 are a vector. Two, the plurality of cells are an array corresponding to a plurality of members on both axes.

Different visualizations can be used when the Z-drawer is associated with a plurality of cells. Since multiple dimensions are involved, techniques like color in stack bar charts and varying shapes in plots may be useful. Like with a single cell, visualizations such as bar chart, tag cloud, map, table and the like may be used. Table 2 shows the suitability of different visualizations and various dimension types for a plurality of selected cells. The visualization is selected based on metadata associated with the data distribution, for example, measure/dimensions information, and number of data points in the distribution.

TABLE 2

| Dimension Type | Visualization (Type - Member Value) | Vector (Remarks) | Array (Remarks) |
|---|---|---|---|
| Geography | Map - Points | | |
| | Map - Risers | ✓ | |
| | Map - Stacked Risers | ✓ | ✓ |
| Time | Chart - Line | ✓ | |
| Non-Specialized | Chart - Surface | ✓ | |
| | Chart - Bar Chart | ✓ | |
| | Chart - Stacked Bar; Multi-Pie; etc. | ✓ | ✓ |
| | Chart - Scatter | ✓ (If vector spans two measures.) | ✓ (If array spans two measures.) |
| | Chart - Bubble | ✓ (If vector spans three measures.) | ✓ (If array spans three measures.) |
| | Chart - Bubble + Color | ✓ (If vector spans four measures.) | ✓ (If array spans four measures.) |

Figure 6:
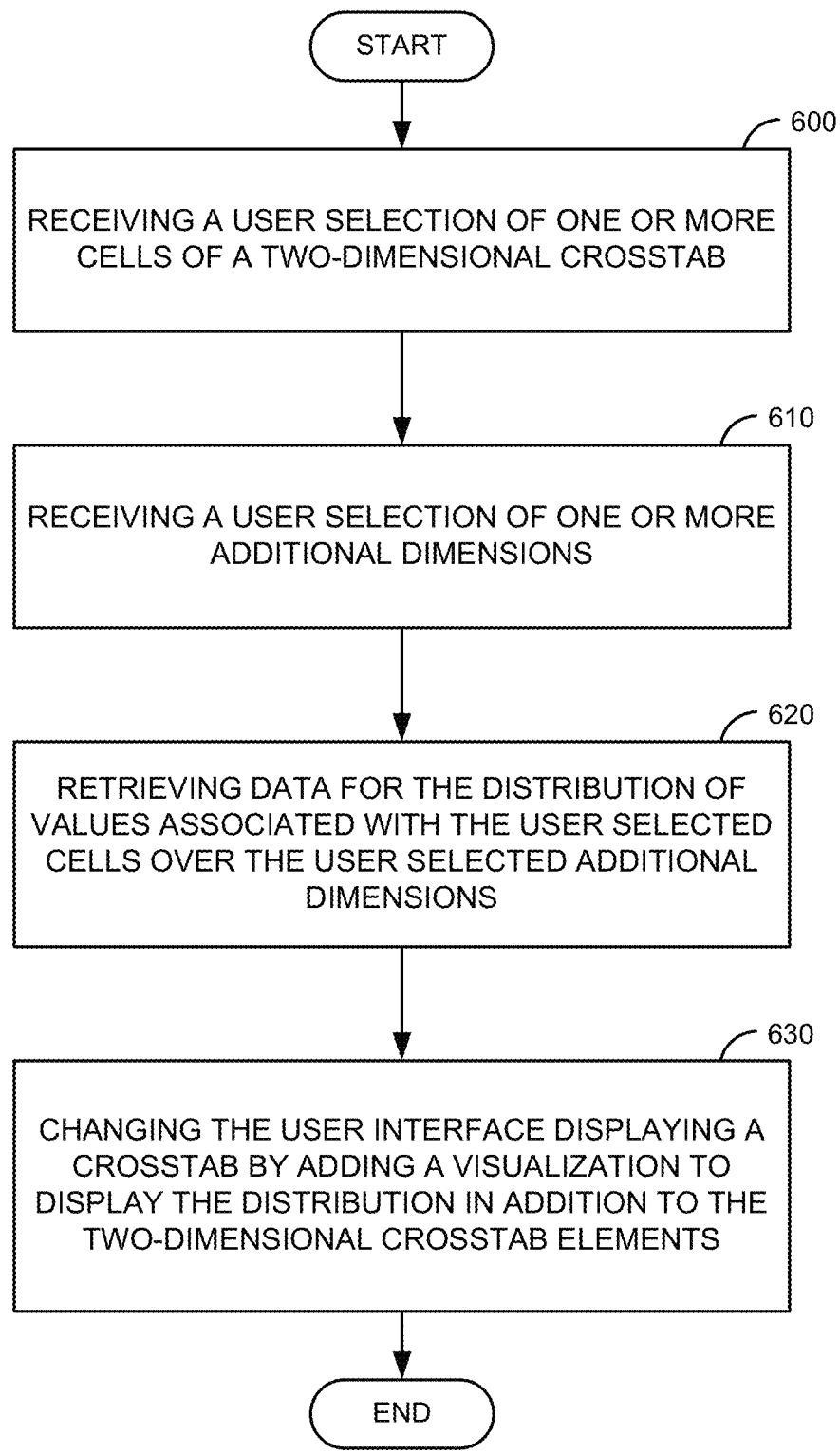
FIG. 6 is a flow diagram of an embodiment of the invention for analyzing multidimensional data.

FIG. 6 is a flow diagram of an embodiment of the invention for analyzing multidimensional data.

At block 600, one or multiple cells are selected in a crosstab. The selected cells represent data related to a slice along one dimension of a data cube. Each cell is associated with a tuple in a multi-dimensional data source. Each cell is associated with a member that defines its row and a member that defines its column within the crosstab. In other words, a specific member from each dimension defining the rows and columns of the crosstab. The selection may comprise a single cell, a complete row of cells (vector), a column of cells (vector) or another collection of cells (e.g., array).

At block 610, one or more additional dimensions are selected. These additional dimensions have not been used to construct the rows and columns of the crosstab. An additional dimension may also be referred to as a Z-dimension. A common action in analyzing complex multidimensional data is "peeking" at a slice axis dimension. Peeking is a gesture that allows something to be viewed without committing to the move and without disrupting the current two-dimensional view. The two-dimensional view is usually presented in the form of a crosstab.

The data for the distribution of values associated with the selected cells over the selected additional dimensions is retrieved at block 620. The query filters for values associated with the cells in the selection. Specifically, the query filters for the specific members that define the selected cells and arranges the result by the additional dimensions. In some embodiments, MDX queries are used for retrieving the data. An MDX query includes the members defining the selected cells rows and columns as part of the row portion of the query. The additional dimension is associated with the columns portions of the query.

Finally, the retrieved data for the distribution is displayed at block 630. The graphical user interface (GUI) displaying the crosstab is changed by adding a visualization to display the distribution. This visualization is in addition to the crosstab so as to effect a peeking action. The data may be displayed, for example, in a so called Z-dimensional drawer, which is a window that appears in the GUI to show the visualization with a distribution of the cells' value over the additional dimension. In FIG. 1, the Z-dimensional drawer 110 represents the data in a bar chart. The data can be presented in various ways, for example tag clouds, as shown in FIG. 2 or a map, as shown in FIG. 3. The appropriate representation depends on the nature of the data. There are known techniques, which use metadata for choosing the criteria for the data to be plotted and they infer a good visualization of the data. Some of these are summarized in Table 1 and Table 2.

In some embodiments, the visualization for the data distribution on Z-dimension is part of a Z-dimensional drawer. The drawer may be opened as part of a gesture for selecting the cells and additional dimension. The same gesture may be part of invoking the invocation of the associated query. The gesture may be a grab and pull on some aspect of a cell designed for such a gesture. For example, by means of a handle adjacent to the cells. Such handles are presented in FIG. 7. The handles 710 and 720 are adjacent to the cells 730 and 740 respectively. Handle 710 is an example of a handle when the cell is selected. Handle 720 is an example of handle when the user is hovering over the same selected cell. The shape of the handle and the way the handle is exposed and located may differ according to embodiments of the invention. The way it is exposed could be via techniques like mouse over, mouse click, menu item and so on. The handle may be placed on the side or top of a cell or group of cells. The handle can be replaced by a knob, pull, or the like. As well the handle can be dispensed with in favour of highlight and the like.

In one embodiment, after pulling a handle adjacent to a cell, an initial query is executed on a server, which returns distribution of the cell value over a first group of Z-dimension members at lowest level of the selected hierarchy. After execution of this query, the result is sent back to fill in a Z-drawer. If the handle is pulled again, another query is executed, which returns values corresponding to a next group of members. The more the drawer is pulled out, the more queries are sent, and the more values are retrieved. The retrieving in groups is done in order to avoid full query cost. This is also known as incremental query execution. The incremental query execution is cost effective. In one embodiment the incremental query execution may start at the highest level of the selected hierarchy. In this example, once all the values corresponding to the top level members are retrieved, another query is executed, which returns distribution of the cell values over the second level members of the hierarchy and so on until reaching the lowest level.

FIG. 8 is a block diagram of an embodiment of the invention for a computer system 800 to analyze multidimensional data. The computer system 800 incorporates a memory 810, a processor 830 and an I/O interface 840. The memory 810, the processor 830 and the I/O interface 840 may communicate with each other via the system bus 860. The memory 810 encompasses a display module 815 and an analysis module 820. An output device 850, an input device 855, or more of either, are connected to the system 800 via the I/O interface 840. The analysis module 820 is used in analyzing multidimensional data. After receiving a selection of a cell or a collection of cells from a crosstab, the analysis module 820 is responsible for sending a query for the distribution of the cell(s) value over different Z-dimension members. The returned distribution is sent as an output to the output device 850 to render a GUI presenting the distribution of the cell(s) value over the Z-dimension. In one embodiment, the returned distribution is retrieved in parts by the analysis module 820 to avoid full query cost. The display module 815 organizes the representation of the data in the GUI, rendered on the output device 850. In one embodiment the output device 850 is a display.

An embodiment of the present invention relates to a computer storage product with a computer-readable medium having computer code thereon for performing various computer-implemented operations. The media and computer code may be those specially designed and constructed for the purposes of the present invention, or they may of the kind well known and available to those having skill in the computer software arts. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine executable software instructions.

The foregoing description, for purposes of explanation, used specific nomenclature to provide a thorough understanding of the invention. However, it will be apparent to one skilled in the art, that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and the equivalents define the scope of the invention.

What is claimed is:

1. A non-transitory computer readable medium comprising computer readable instructions, which, when executed by a computer, cause the computer to perform a method, comprising:
    displaying only a two-dimensional view of values across two measures;
    receiving a selection of a slice axis dimension as a third dimension to the only two-dimensional view;
    receiving a selection of at least one cell from the only two-dimensional view to show distribution of a value of the at least one cell over the third dimension;
    upon activating a handle attached to the at least one cell from the only two-dimensional view, executing a query retrieving third dimensional values along the distribution of the value of the at least one cell over the third dimension; and
    displaying a visual representation of the third dimensional values along the distribution of the value of the at least one cell, the visual representation displayed floating above and in addition to the only two-dimensional view, the visual representation displaying the distribution of values changeably presented as a selection of one of: a chart, tags, a map, and a table.

2. The computer readable medium of claim 1, wherein the handle is exposed by receiving an input device event.

3. The computer readable medium of claim 1, wherein the handle is exposed by receiving a command from a menu item.

4. The computer readable medium of claim 1, wherein retrieving the third dimensional values along the distribution of the value of the at least one cell further comprises executing queries in parts, to avoid full query cost, the queries returning a set of the third dimensional values along the distribution of the value of the selected at least one cell over a part of third dimension members.

5. The computer readable medium of claim 4, wherein the returned set of the third dimensional values along the distribution of the cell value over the part of the third dimension members starts at lowest or highest level of a selected hierarchy.

6. The computer readable medium of claim 4, wherein the queries are executed until desired data is retrieved.

7. A computerized method for analyzing multidimensional data, comprising:
    displaying only a two-dimensional view of values across two measures;
    receiving a selection of a tuple from the only two-dimensional view, wherein the tuple is associated with a first member of a first dimension and a second member of a second dimension;
    receiving a selection of a third dimension to the only two-dimensional view;
    upon activating a handle attached to a cell associated with the tuple, executing a query retrieving third dimensional values along a data distribution associated with the first member, the second member and the third dimension, wherein the third dimensional values along the data distribution present data filtered for the first member and the second member, and grouped by the members in the third dimension; and
    generating and displaying a visualization of the third dimensional values along the data distribution associated with the first member, the second member, and the third dimension, wherein the visualization is displayed floating above and in addition to the only two-dimensional view formed by the first dimension and the second dimension, the visualization displaying the distribution of values changeably presented as a selection of one of: a chart, tags, a map, and a table.

8. The method of claim 7, wherein the handle is exposed by receiving an input device event, or receiving a command from a menu item.

9. The method of claim 7, wherein retrieving the third dimensional values along the data distribution further comprises:
associating the first member and second member with a row axis of a multi-dimensional query; and
associating the third dimension with a column axis of the multi-dimensional query.

10. The method of claim 7, wherein retrieving the third dimensional values along the data distribution associated with the first member, the second member and the third dimension further comprises executing queries in parts, wherein the queries are formed from parts of third dimension members.

11. The method of claim 10, wherein the queries are executed until desired data is retrieved.

12. The method of claim 7, wherein the visualization is selected based on meta-data associated with the data distribution, wherein the metadata comprises at least one of the group consisting of measure information, dimensions information, and a number of data points in the data distribution.

13. The method of claim 7, wherein the tuple is associated with a cell included in a plurality of cells.

14. The method of claim 13, wherein the plurality of cells is a vector or an array.

15. The method of claim 13, wherein the visualization is selected based on shape of the plurality of cells.

16. A computer system for analyzing multidimensional data, comprising:
a memory, the memory having stored thereon executable instructions related to:
an analysis module operable to, in response to activating a handle attached to at least one cell from only a two-dimensional view of values across two measures, execute a query to retrieve third dimensional values along a distribution of a value of the at least one cell over a third dimension; and
a display module to display a visual representation of the third dimensional values along the distribution of the value of the at least one cell, the visual representation displayed floating above and in addition to the only two-dimensional view, the visual representation displaying the distribution of values changeably presented as a selection of one of: a chart, tags, a map, and a table; and
a processor operable to execute the instructions in the memory related to the analysis module and the display module.

17. The system of claim 16, wherein the analysis module is further operable to retrieve a set of the third dimensional values along the distribution of the value of the at least one cell over the third dimension in parts.

18. The system of claim 16, wherein the display module is operable to display the third dimensional values along the distribution of the value in an expanded form occupying an ideal layout next to the display of the only two-dimensional view.

19. A non-transitory computer readable medium comprising computer readable instructions, which, when executed by a computer, cause the computer to perform a method, comprising:
displaying only a two-dimensional view of values across two measures;
receiving a selection of a slice axis dimension as a third dimension to the only two-dimensional view;
receiving a selection of at least one cell from the only two-dimensional view to show distribution of a value of the at least one cell over the third dimension;
upon activating a handle attached to the at least one cell, executing a query retrieving third dimensional values along the distribution of the value of the at least one cell over the third dimension; and
displaying a visual representation of the third dimensional values along the distribution of the value of the at least one cell, the visual representation displayed floating above and in addition to the only two-dimensional view, and wherein the visual representation is a geographical map indicating the distribution of values by graph reflective of their geographical location on the geographical map.

* * * * *